(12) United States Patent
Li (10) Patent No.: US 11,084,104 B2
(45) Date of Patent: Aug. 10, 2021

(54) HAND-TIGHT DRILL CHUCK WITH LOCK

(71) Applicant: ZHEJIANG SANOU MACHINERY CO. LTD., Zhejiang (CN)

(72) Inventor: Xiangyu Li, Zhejiang (CN)

(73) Assignee: ZHEJIANG SANOU MACHINERY CO. LTD., Zhejiang (CN)

( * ) Notice: Subject to any disclaimer, the term of this patent is extended or adjusted under 35 U.S.C. 154(b) by 0 days.

(21) Appl. No.: 16/662,331

(22) Filed: Oct. 24, 2019

(65) Prior Publication Data
US 2020/0139450 A1    May 7, 2020

(30) Foreign Application Priority Data
Nov. 5, 2018    (CN) .......................... 201811307355.X (51) Int. Cl.
*B23B 31/12*    (2006.01)

(52) U.S. Cl.
CPC ........ *B23B 31/123* (2013.01); *B23B 31/1238* (2013.01); *Y10T 279/32* (2015.01)

(58) Field of Classification Search
CPC ........... Y10T 279/17632; Y10T 279/32; Y10T 279/38; Y10T 279/902; B23B 31/1207; B23B 31/123; B23B 31/1246; B23B 31/1238; B23B 2231/38; Y10S 279/902
See application file for complete search history.

(56) References Cited

U.S. PATENT DOCUMENTS

| 5,765,839 A | 6/1998 | Röhm |
| 7,896,356 B2 * | 3/2011 | Zhou .................... B23B 31/1238 |
| | | 279/62 |
| 7,972,093 B2 * | 7/2011 | Li ........................... F16D 41/12 |
| | | 408/124 |

FOREIGN PATENT DOCUMENTS

| CN | 201455332 U | * | 5/2010 | |
| WO | WO-2017024544 A1 | * | 2/2017 | ......... B23B 31/1238 |

* cited by examiner

*Primary Examiner* — Chwen-Wei Su
(74) *Attorney, Agent, or Firm* — Muncy, Geissler, Olds & Lowe, P.C.

(57) ABSTRACT

A hand-tight drill chuck with a lock and self-locking structure including an elastic piece with an arcuate portion, arranged on a ring member threadedly connected to a clamping claw. The two ends of the arcuate portion are restricted. The elastic piece has a locking portion and groove or protrusion that cooperate with teeth between two ends of the arcuate portion. The drill chuck has a rotation sleeve with control structure. The control structure includes a metal member with elastic portion having a protrusion or groove that cooperate with the groove or protrusion. When the groove or protrusion of the elastic piece withstands against and is engaged with the protrusion or groove of the metal member via elasticity, the drill chuck is in a self-locking state. This ensures a locking torque and unlocking torque by elastic match between an elastic force which is not slack.

8 Claims, 7 Drawing Sheets

HAND-TIGHT DRILL CHUCK WITH LOCK

TECHNICAL FIELD

The present invention relates to a hand-tight drill chuck with a lock.

TECHNICAL BACKGROUND

The structure of a hand-tight drill chuck in the prior art mainly includes a drill body, a clamping jaw, a nut, a nut sleeve, a ball bearing, a washer, a front sleeve and a rear sleeve, the drill body has three inclined clamping jaw holes thereon, the clamping jaw moves in the clamping jaw hole by the engagement of a thread on one side thereof and a thread on the inner side of the nut, the nut sleeve is provided on the nut via interference fit, the front sleeve cooperates with the nut sleeve, the front sleeve rotates to drive the nut sleeve to rotate, the nut sleeve drives the nut to rotate, the nut drives the clamping jaw to move, the ball bearing is placed between the washer and the nut, the washer is placed on the drill body, the rear sleeve is provided on the rear end of the drill body via the interference fit, a locking structure of a hand-tight drill chuck with a lock of U.S. Pat. No. 5,765,839A is added with a front end of the drill body and has a one-way ratchet on the outer circumference of the drill body based on the hand-tight drill chuck in the prior art; the nut sleeve is provided thereon with an elastic piece; the elastic piece has a positioning protrusion and a locking protrusion thereon, a pawl is provided on the side of the locking protrusion. The front sleeve has a groove and a protrusion in an inner portion that cooperate with the protrusion on the elastic piece. The locking structure has the disadvantages of a small locking torque and an unlocking torque and hanging teeth, the elastic piece is easily deformed in the nut sleeve, a plastic front sleeve is easy to wear, and the service life of the locking structure is short.

SUMMARY

The technical problem to be solved by the present invention is to provide a hand-tight drill chuck with a lock, the structure thereof is reasonable, an elastic piece is fastened and is not easy to be softly stressed, and the drill chuck has good locking performance. To this end, the present invention adopts the following technical solution:

A hand-tight drill chuck with a lock includes a drill body, a ring member, a clamping jaw and a self-locking structure, wherein the ring member has an internal thread while an outer side of the clamping jaw has a thread, the ring member and the clamping jaw are threadedly connected, the self-locking structure includes a ring of teeth, a ring of the teeth is arranged on the drill body or arranged on a component fixed to the drill body; wherein the self-locking structure further includes an elastic piece having an arcuate portion, an elastic piece is arranged on the ring member, both ends of the arcuate portion are restricted, the elastic piece is provided with a lock portion and a groove or a protrusion that cooperate with a ring of the teeth the elastic piece between the two ends of the arcuate portion, the drill chuck is provided with a rotation sleeve, and the rotation sleeve is provided with a control structure so that the self-locking structure is in a self-locking state or an unlocked state, the control structure includes a metal member having an elastic portion, the elastic portion is provided with the protrusion or the groove matched with the groove or the protrusion of the elastic piece, when the groove or the protrusion of the elastic piece tightly withstands against and is engaged with the protrusion or the groove of the metal member by elasticity, the drill chuck is in a self-locking state.

When the drill chuck is in an unlocked state, the rotation sleeve is coupled with and cooperates with the elastic piece, and the rotation sleeve drives the ring member to be rotated forward and then rotated backward.

Further, the groove or the protrusion of the elastic piece is adjacent to the middle of the arcuate portion, the lock portion is adjacent to the groove or a convex portion, the control structure controls the lock portion to be inserted into a ring of the teeth by the engagement of the protrusion or the groove of the metal member and the groove or the protrusion of the elastic piece, so that the self-locking structure is in a self-locking state.

Further, the metal member is further provided with a connection portion, when the drill chuck is in the unlocked state, the rotation sleeve drives the ring member to be rotated forward and then rotated backward by the cooperation of the connection portion and the connection portion on the elastic piece, and the two metal surfaces contact and rub, and the inner surface of the rotation sleeve does not wear.

Further, the metal member is further provided with a connection portion, the elastic piece is provided with the connection portion between the groove or the protrusion and the lock portion, when the drill chuck is in the unlocked state, the rotation sleeve drives the ring member to be rotated forward and then rotated backward by the cooperation of the connection portion thereon and the connection portion on the elastic piece, the two metal surfaces are in contact with each other and rub, the inner surface of the rotation sleeve does not wear.

Further, the metal member on the rotation sleeve is a section of a metal sheet fixed to the inner wall of the rotation sleeve.

Further, the metal member on the rotation sleeve is a section of the metal sheet fixed to the inner wall of the rotation sleeve, the two ends of the metal sheet are connected with the rotation sleeve, the portion between the two ends that is at least provided with the protrusion or the groove is high up in the air over the rotation sleeve.

Further, the end portion of the ring member is provided with a plurality of the protrusions, one end of the elastic piece has a sleeving portion and fixed onto one of the protrusions of the ring member via the sleeving portion, the other end of the elastic piece withstands onto the other one of the protrusions by elasticity and forms the arcuate portion between the both ends where the both ends are restricted.

The present invention ensures a locking torque and an unlocking torque by elastic match between an elastic force which is not slack and the elastic part of the metal member provided by the arcuate portion, and the self-locking control with a positioning function, avoids the defect of hanging teeth and has a longer service life.

DETAILED DESCRIPTION

Embodiment 1, reference is made to FIGS. 1-8.

Figure 1:
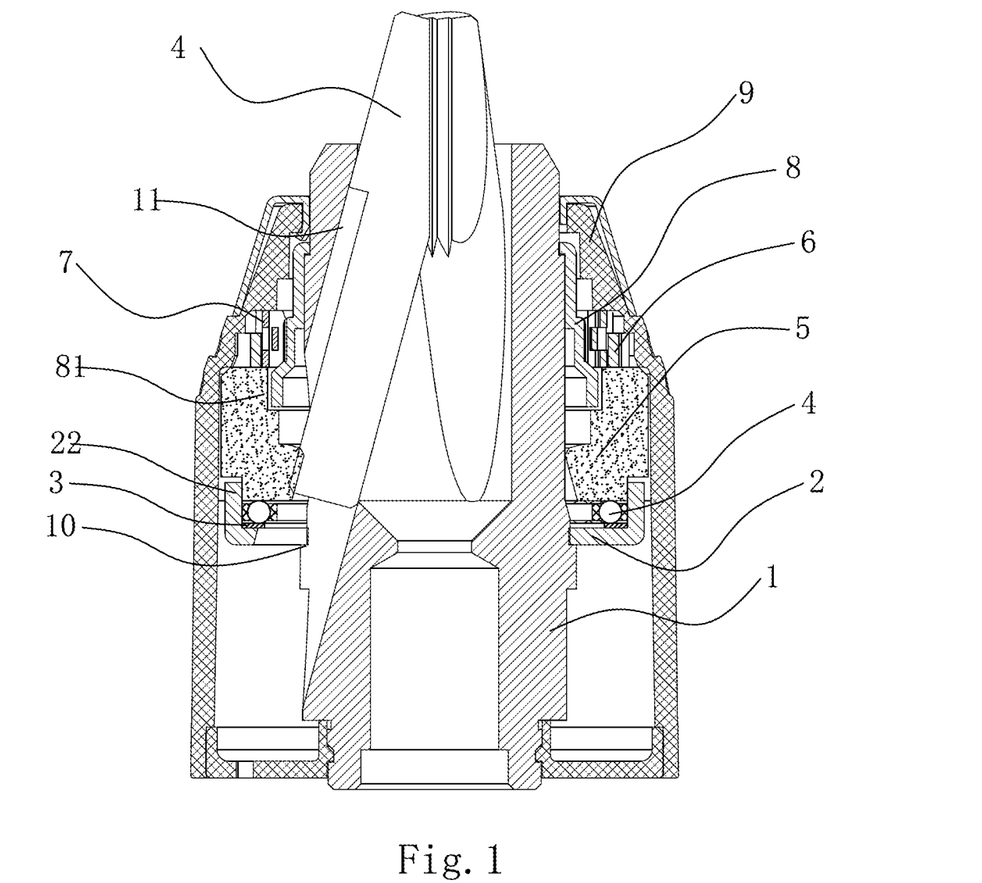
FIG. 1 is a sectional view of Embodiment 1 of the present invention.
Figure 2:
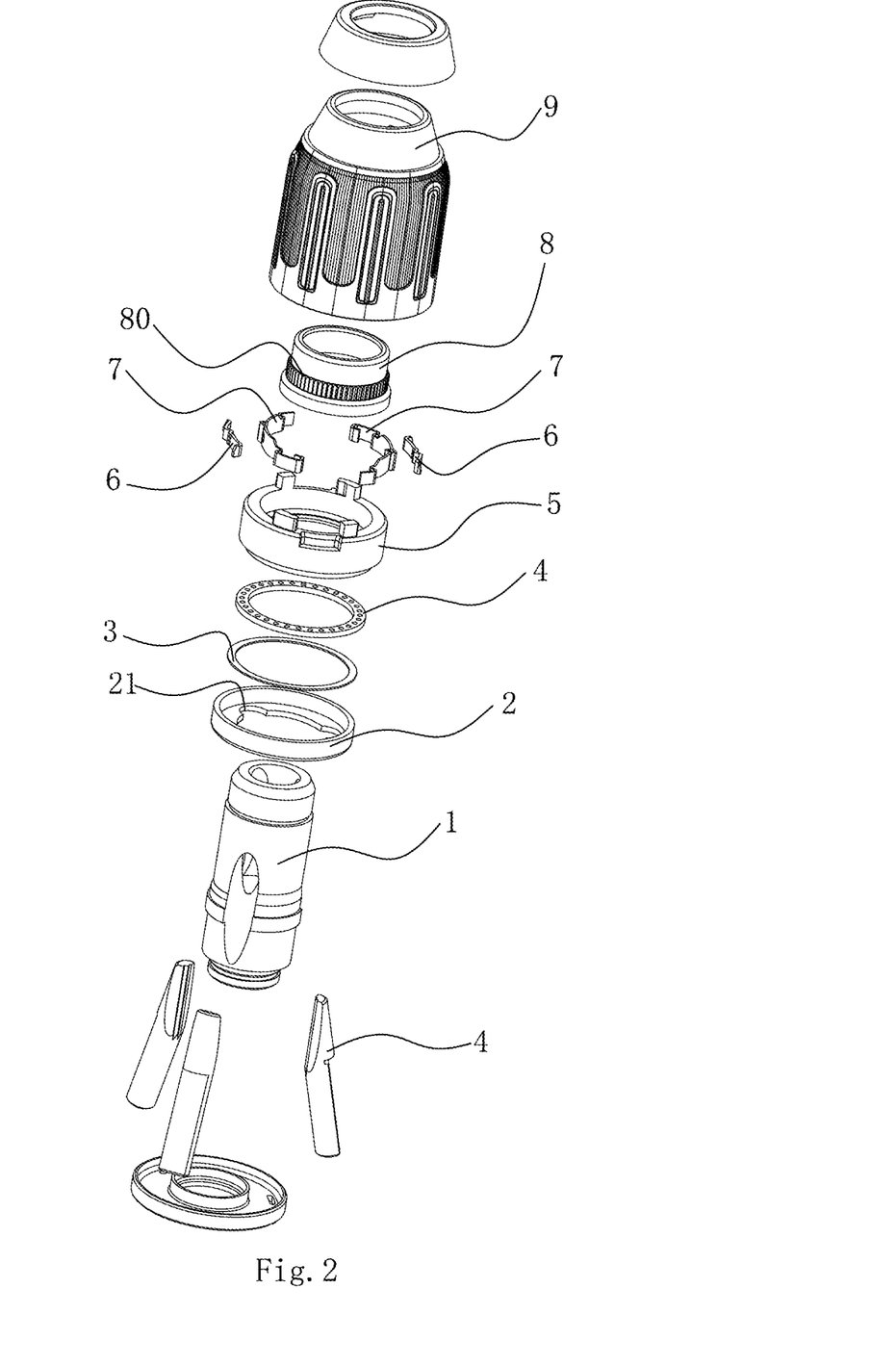
FIG. 2 is an exploded view of Embodiment 1 of the present invention.

A hand-tight drill chuck with a lock provided by the present invention includes a drill body 1, a ring member, a clamping jaw 4, a rotation sleeve 9 and a self-locking structure, wherein the ring member is a ring with an internal thread, the ring can be an integral nut 5, the outer side of the clamping jaw 4 has a thread, the nut 5 and the clamping jaw 4 are threadedly connected, the self-locking structure includes a ring of teeth 80 and an elastic piece 7, a ring of the teeth 80 is arranged on a component fixed to the drill body, 8, the elastic piece 7 is placed on the nut 5.

Figure 4:
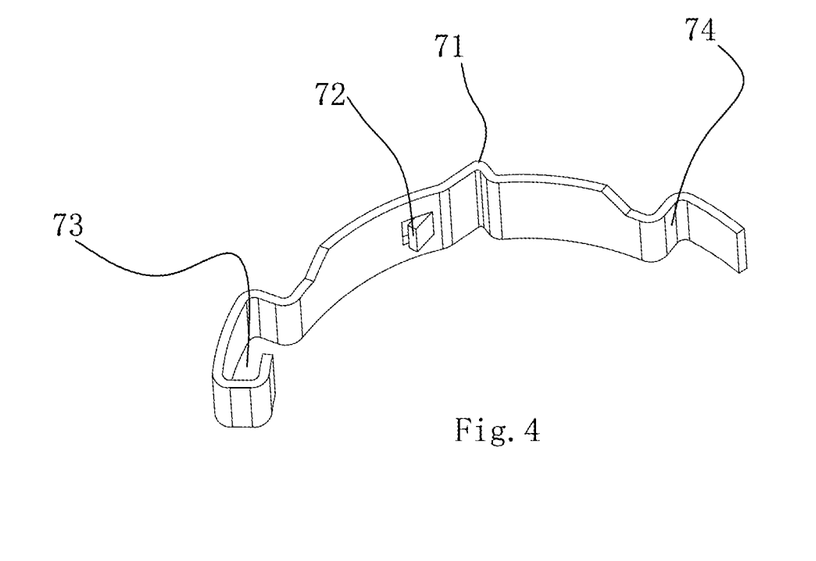
FIG. 4 is a view of an elastic piece of Embodiment 1 of the present invention.
Figure 5:
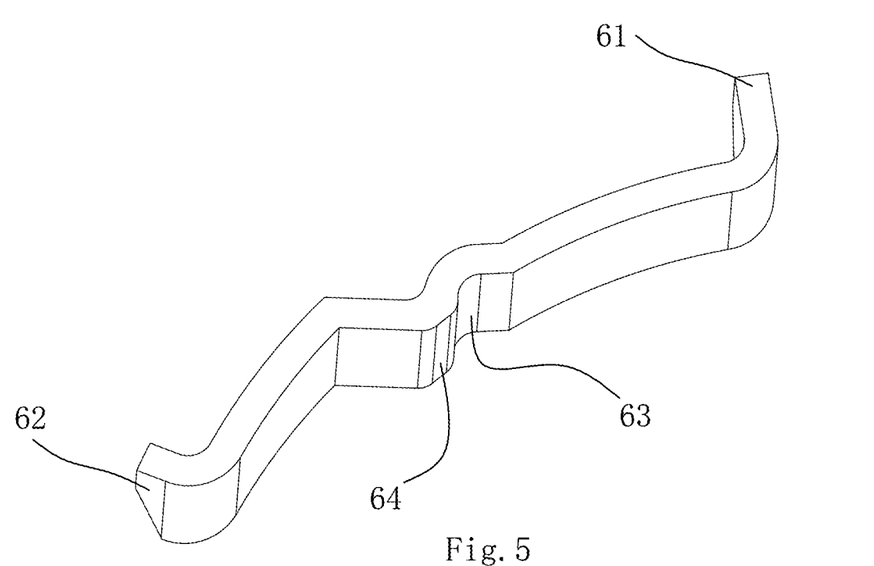
FIG. 5 is a view of a metal sheet fixed to an inner wall of a rotation sleeve of Embodiment 1 of the present invention.

The elastic piece 7 is the elastic piece having an arcuate portion, the arcuate portion may be an entire section of the elastic piece 7 or a partial section of the elastic piece 7, the two ends of the arcuate portion are restricted and fixed, and the elastic piece 7 is formed to be arcuate between the two ends and difficult to stretch to ensure radial yielding and pop-up elasticity, the elastic piece is provided with a locking portion 72 and a protrusion 71 that cooperate with a ring of the teeth 80 between the two ends of the arcuate portion, and the rotation sleeve 9 is provided with a metal member 6 having an elastic portion, the elastic portion of the metal member 6 is provided with the groove 63 that cooperates with the protrusion 71, when the protrusion 71 of the elastic piece tightly withstand against and is engaged with the groove 63 of the metal member by the elasticity of the two sides, the drill chuck is in a self-locking state, at this time, the lock portion 72 is inserted into the teeth 80, the elastic force provided by the arcuate portion that is not slack and the elastic cooperation of the elastic portion of the metal member 6, and the self-locking control formed by the protrusion 71 and the groove 63 and having a positioning function ensure a locking torque and an unlocking torque to avoid the hanging teeth.

Figure 6:
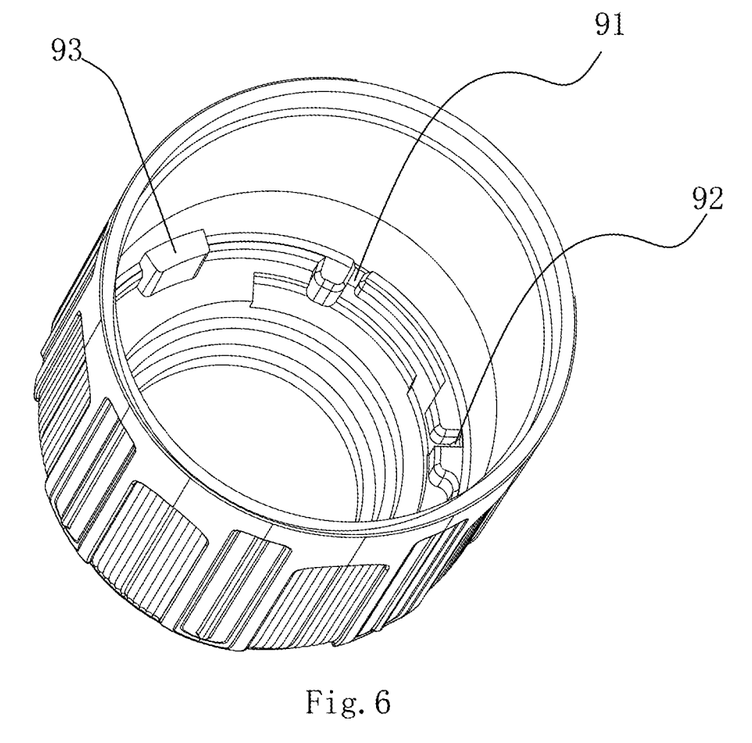
FIG. 6 is a view of a rotation sleeve of Embodiment 1 of the present invention.

The metal member 6 on the rotation sleeve may be a section of the metal member fixed to the inner wall of the rotation sleeve, and uses the leg portions 61, 62 at both ends thereof to be inserted into the grooves 91, 92 of the inner wall of the rotation sleeve 9, and the middle portion thereof is high up in the air over the inner wall of the rotation sleeve to form an elastic portion, so that the installation is very convenient.

Figure 3:
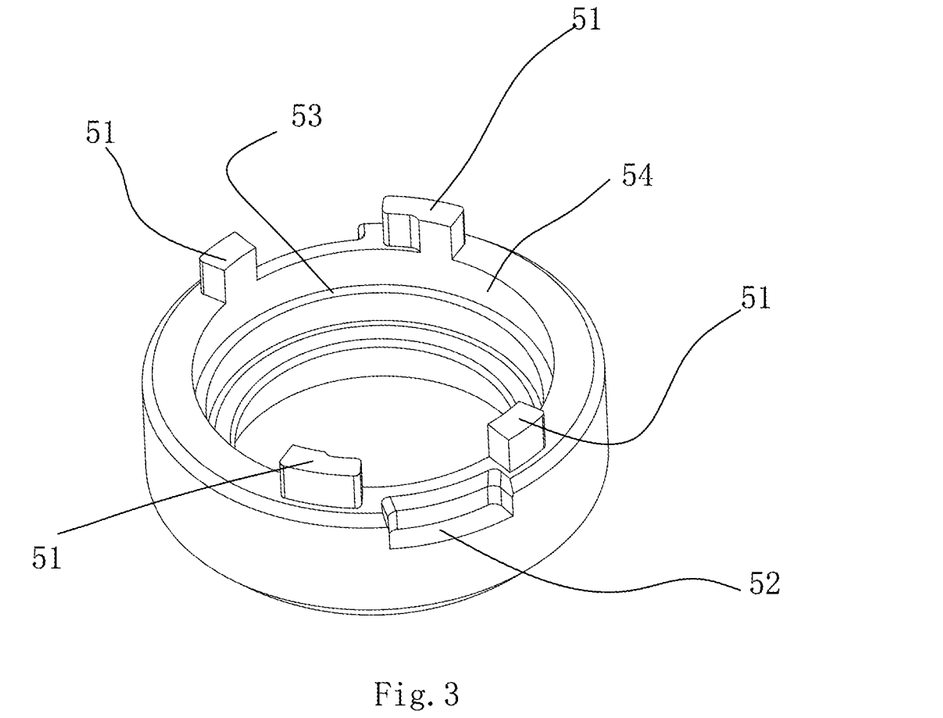
FIG. 3 is a view of a nut of Embodiment 1 of the present invention.

In this embodiment, both ends of the elastic piece 7 are restricted, an entire section of the elastic piece 7 is bent into an arcuate portion where both ends thereof are restricted, the end of the nut 5 is provided with a plurality of the protrusions 51, one end of the elastic piece 7 has a sleeving portion 73, the end of the elastic piece is sleeved onto one of the protrusions 51 of the nut 5 by the sleeving portion 73 to be fixed, and the other end 74 of the elastic piece withstands onto the other one of the protrusions 51 by the elasticity.

The protrusion 71 of the elastic piece is adjacent to the middle of the arcuate portion, the lock portion is adjacent to the protrusion, and the lock portion 72 may be an inwardly tilted ratchet formed by punching on the elastic piece.

Figure 7:
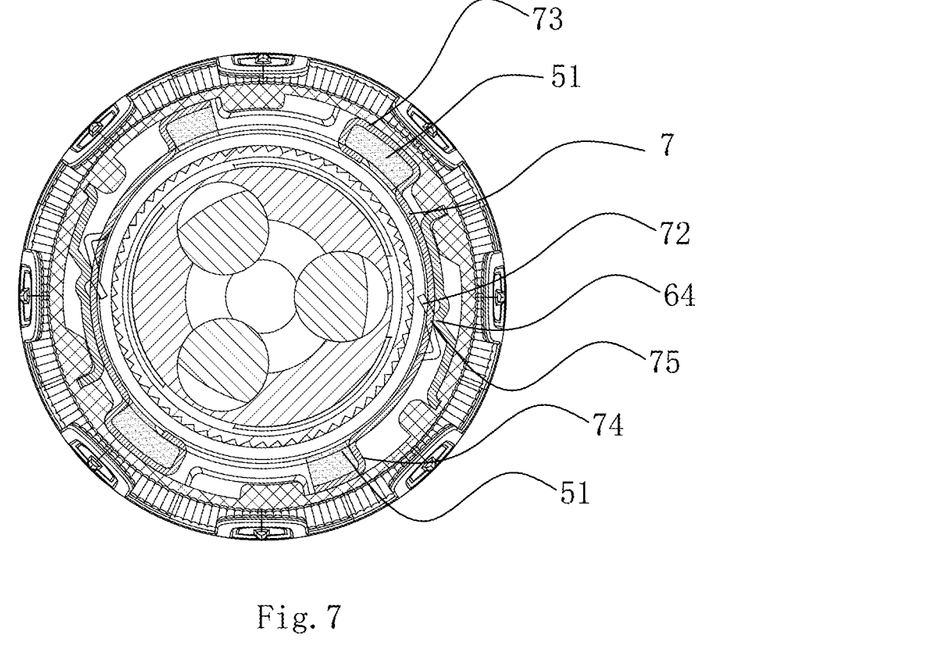
FIG. 7 is a sectional view where a self-locking structure cooperates with other structures of a drill chuck when Embodiment 1 of the present invention is not locked.

When the drill chuck is in an unlocked state, that is, when the lock portion 72 is disengaged from the teeth 80, the rotation sleeve 9 is coupled with and cooperates with the elastic piece 7, the rotation sleeve 9 drives the nut 5 through the elastic piece 7 to be rotated forward and then rotated backward. The rotation sleeve can be connected to and cooperates with the elastic piece via the metal member 6, the metal member 6 is provided with a connection portion 64, the connection portion 64 can be a convex corner of the notch of the groove, 63, as shown in FIG. 7, when the drill chuck is in the unlocked state, the rotation sleeve drives the ring member to be rotated forward and then rotated backward through the cooperation of the connection portion 64 and the connection portion 75 on the elastic piece, the two metal surfaces are in contact with each other and rub, the inner surface of the rotation sleeve does not have wear, the cooperation of the metal member 6 and the elastic piece 7 not only improves the self-locking performance, but also improves the service life of the drill chuck.

The connection portion 75 of the elastic piece is between the protrusion 71 and the lock portion 72.

The component 8 may be a sleeve member fixed to the front portion of the drill body, and the rear portion of the component 8 may serve as a front end limit and an inner radial limit over the nut at the same time, the front inner side of the nut 5 has a corresponding matching step surface 53 and the peripheral wall 54, the cooperation of the limit portion 81 at the rear portion of the component 8 and a step 10 in the middle of the drill body defines an integral nut 5 in an axial direction, reference numeral 4 is the ball bearing cushioned behind the nut 5, reference numeral 2 is a washer supported on the step 10 in the middle of the drill body, a silicon steel shrapnel ring 3 is provided between the ball bearing and the washer 2, the washer 2 is fixed to the drill body 1 and has a clamping jaw hole 21 on the drill body for the clamping jaws to pass through and support. The washer 2 is also provided with an outer radial limit portion 22 over the nut 5.

The nut 5 is provided thereon with a drive groove 52, the inside of the rotation sleeve 9 is provided with a drive key 93, the arc of the drive groove is larger than the arc occupied by the drive key 93, the difference between the two arcs is equal to the angle of rotation required by the nut when the drill chuck enters the self-locking state from the unlocked state, the clamping jaw of the drill chuck substantially clamps a drill bit, after the drill chuck enters the self-locking state from the unlocked state, the drive key 93 cooperates with the wall of one side of the drive groove 52 to drive the nut 5 to rotate and input a larger torque to clamp the drill bit, after the drill chuck returns from the self-locking state back to the unlocked state, the drive key 93 cooperates with the wall of the other side of the drive groove 52 to drive the nut 5 to be rotated backward to drive the clamping jaw to retreat.

Refer to the drawings. The operation description of the novel hand-tight drill chuck with a lock provided by the present invention is as follows:

As shown in FIG. 7, in the unlocked state, an elastic piece 7 is still in a state of no slack. A rotation sleeve drives the nut 5 to be rotated via the elastic piece 7 to achieve the actions of extending and contracting a clamping jaw.

Figure 8:
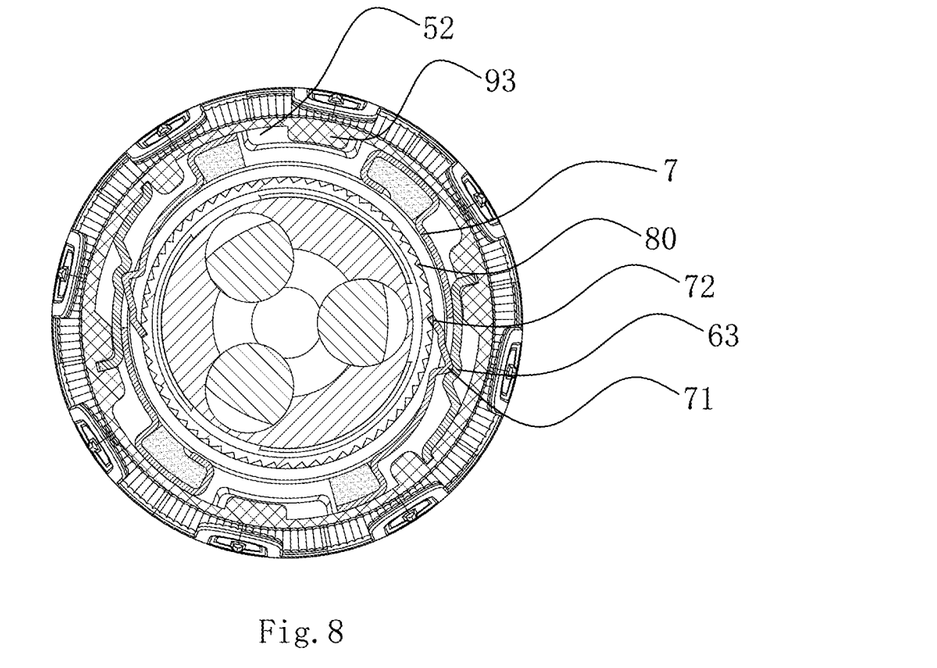
FIG. 8 is a sectional view where a self-locking structure cooperates with other structures of a drill chuck when Embodiment 1 of the present invention is locked.

When the clamping jaw 3 clamps the drill bit, the nut 2 is no longer rotated, at this time, a torque force is continuously applied to and clamps the rotation sleeve 9, the rotation sleeve 9 drives the elastic piece 7 to be rotated, a control structure on the rotation sleeve 9, that is, the connection portion 64 on the metal member 6 of the embodiment and the inclined surface thereof press against the elastic piece 7, so that a locking portion 72 on the elastic piece 7 approaches the teeth 80, and the elastic piece 7 is still in a state of no slack, and the two ends of the elastic piece are not extended to perform radial deformation. When entering the self-locking state, as shown in FIG. 8, the protrusion 71 on the elastic piece 7 enters the groove 63, and the lock portion 72 is inserted between the teeth 80, at which time, a "tick" sound is generated when the groove falls, prompting that the self-locking state has been entered, in the self-locking state, the elastic piece 7 is still in a state of no slack, maintaining the maximum locking torque and the maximum unlocking torque.

Figure 9:
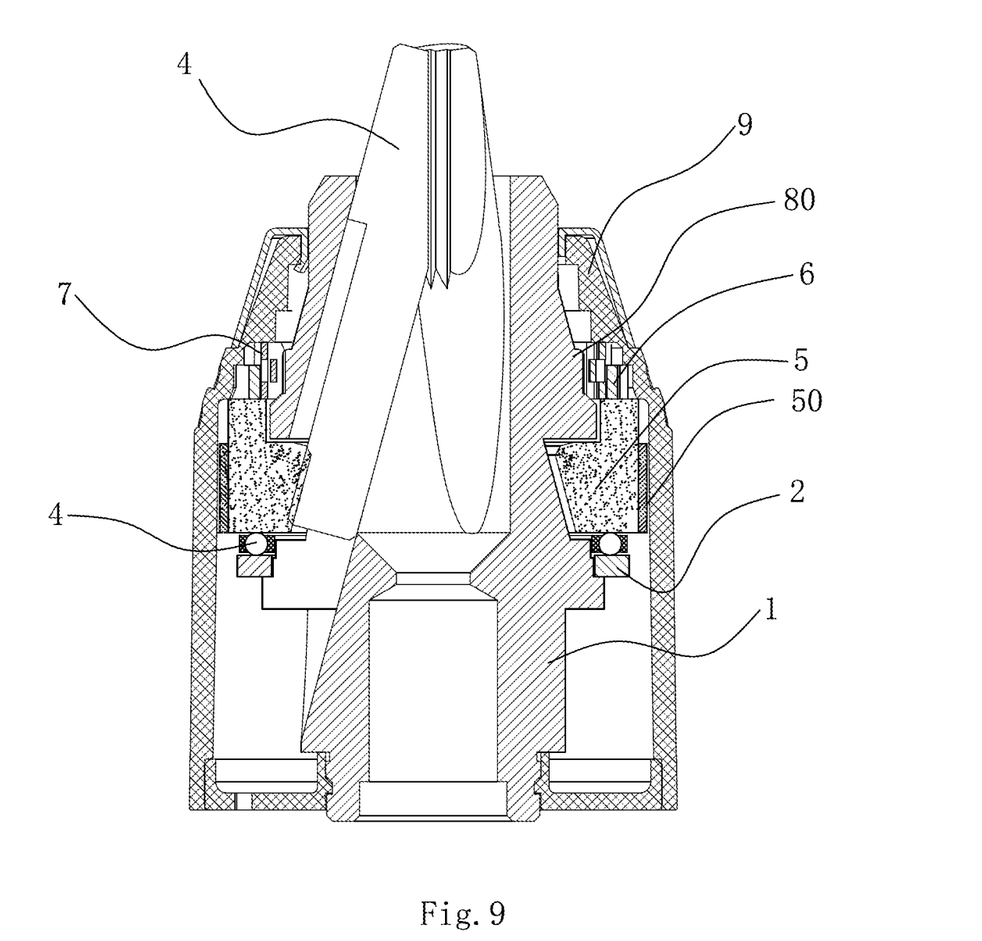
FIG. 9 is a sectional view of Embodiment 2 of the present invention.
Figure 10:
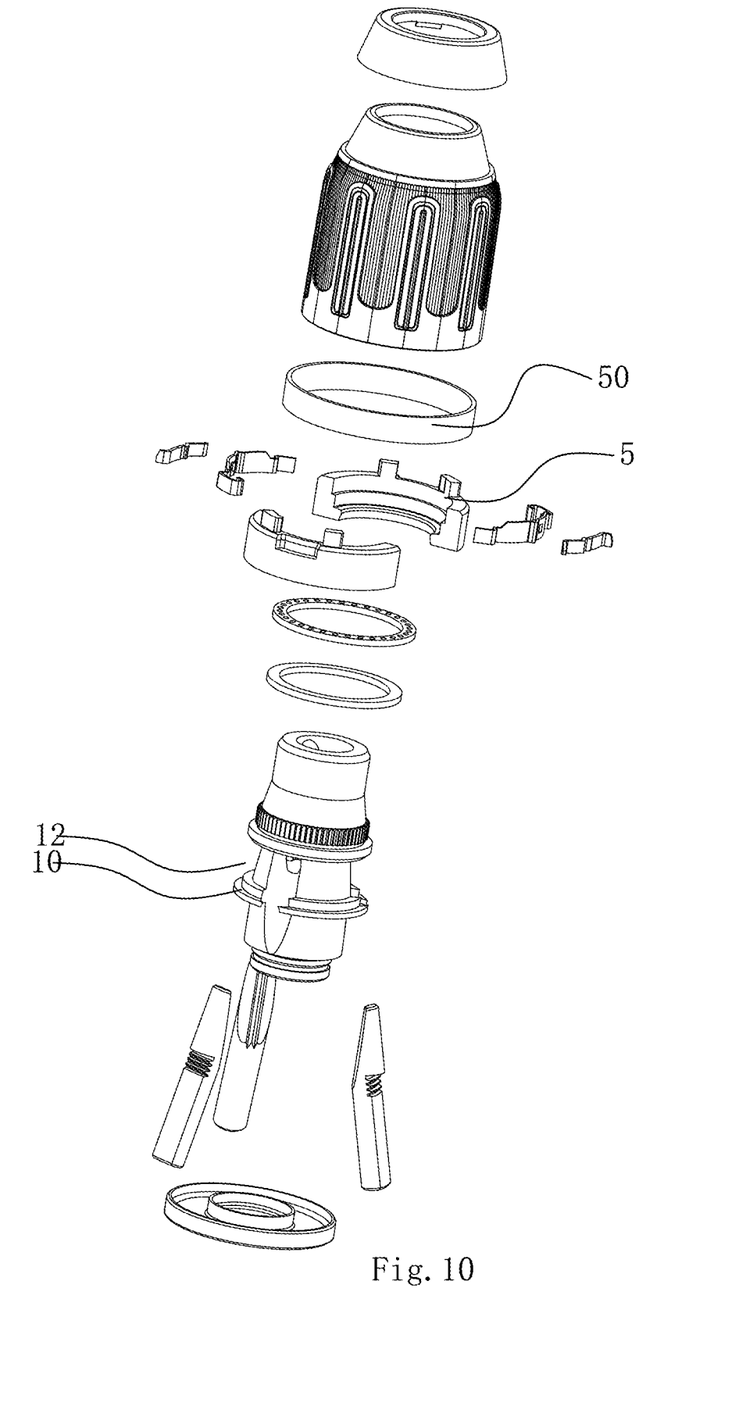
FIG. 10 is an exploded view of Embodiment 2 of the present invention.

Embodiment 2, refers to FIGS. 9 and 10

In the present embodiment, a nut 5 is a two-half type nut and is a ring member that is compounded by a nut sleeve 50. A nut groove 12 is arranged in the middle of a drill body, and the ring member is defined in an axial direction, after the two-half type nut is loaded into the nut groove 12, the two-half type nut is combined into a complete nut by the nut sleeve 50, a ring of teeth 80 is arranged on the drill body, no silicon steel shrapnel ring is arranged behind the nut, and the washer 2 is not provided with a radially outer limit portion over the nut 5. The other parts of the present embodiment are the same as those of Embodiment 1, in FIGS. 9 and 10, the reference numerals are the same as those in Embodiment 1 and denote the same meanings.

The above description is only the specific embodiment of the present invention, but the structural features of the present invention are not limited thereto, and any changes or modifications made by those skilled in the art within the scope of the present invention are covered by the scope of the present invention.

The invention claimed is:

1. A hand-tight drill chuck with a lock, comprising:
   a drill body,
   a ring member,
   a clamping jaw, and
   a self-locking structure,
   wherein the ring member has an internal thread while an outer side of the clamping jaw has a thread, the ring member and the clamping jaw are threadedly connected, the self-locking structure comprises a ring of teeth, a ring of the teeth is arranged on the drill body or arranged on a component fixed to the drill body;
   wherein the self-locking structure further comprises an elastic piece having an arcuate portion, the elastic piece is arranged on the ring member, both ends of the arcuate portion are restricted, the elastic piece is provided with a lock portion and a groove or a protrusion that cooperate with a ring of the teeth between the two ends of the arcuate portion, the drill chuck is provided with a rotation sleeve, and the rotation sleeve is provided with a control structure so that the self-locking structure is in a self-locking state or an unlocked state,
   wherein the control structure comprises a metal member having an elastic portion between two ends which are inserted into an inner wall of the rotation sleeve, the elastic portion of the metal member is provided with a protrusion or groove matched with the groove or the protrusion of the elastic piece, when the groove or the protrusion of the elastic piece tightly withstands against and is engaged with the protrusion or the groove of the metal member by elasticity, the drill chuck is in a self-locking state.

2. The hand-tight drill chuck with the lock according to claim 1, wherein when the drill chuck is in an unlocked state, the rotation sleeve is coupled with and cooperates with the elastic piece, and the rotation sleeve drives the ring member to be rotated forward and then rotated backward.

3. The hand-tight drill chuck with the lock according to claim 2, wherein the metal member is further provided with a connection portion, and the elastic piece is provided a connection portion, when the drill chuck is in the unlocked state, the rotation sleeve drives the ring member to be rotated forward and then rotated backward by the cooperation of the connection portion of the metal member and the connection portion on the elastic piece, and the two metal surfaces contact and rub, and the inner surface of the rotation sleeve does not wear.

4. The hand-tight drill chuck with the lock according to claim 3, wherein the elastic piece is provided with the connection portion between the groove or the protrusion and the lock portion, when the drill chuck is in the unlocked state, the rotation sleeve drives the ring member to be rotated forward and then rotated backward by the cooperation of the connection portion thereon and the connection portion on the elastic piece, the two metal surfaces are in contact with each other and rub, the inner surface of the rotation sleeve does not wear.

5. The hand-tight drill chuck with the lock according to claim 1, wherein the groove or the protrusion of the elastic piece is adjacent to the middle of the arcuate portion, the lock portion is adjacent to the groove or a convex portion, the control structure controls the lock portion to be inserted into a ring of the teeth by the engagement of the protrusion or the groove of the metal member and the groove or the protrusion of the elastic piece, so that the self-locking structure is in a self-locking state.

6. The hand-tight drill chuck with the lock of claim 1, wherein the metal member on the rotation sleeve is a section of a metal sheet fixed to the inner wall of the rotation sleeve.

7. The hand-tight drill chuck with the lock according to claim 1, wherein the metal member on the rotation sleeve is a section of the metal sheet fixed to the inner wall of the rotation sleeve, the two ends of the metal sheet are connected with the rotation sleeve, the portion between the two ends that is at least provided with the protrusion or the groove is high up in the air over the rotation sleeve.

8. The hand-tight drill chuck with the lock according to claim 1, wherein the end portion of the ring member is provided with a plurality of the protrusions, one end of the elastic piece has a sleeving portion and fixed onto one of the protrusions of the ring member via the sleeving portion, the other end of the elastic piece withstands onto the other one of the protrusions by elasticity and forms the arcuate portion between the both ends where the both ends are restricted.

* * * * *